US012593194B2

(12) United States Patent
Mezza et al.

(10) Patent No.: US 12,593,194 B2
(45) Date of Patent: Mar. 31, 2026

(54) VIRTUAL BASS ENHANCEMENT BASED ON SOURCE SEPARATION

(71) Applicant: INVENTVM Semiconductor SRL, Pavia (IT)

(72) Inventors: Alessandro Ilic Mezza, Milan (IT); Riccardo Giampiccolo, Cisliano (IT); Alberto Bernardini, Milan (IT); Augusto Sarti, Seregno (IT)

(73) Assignee: INVENTVM Semiconductor Srl, Pavia (IT)

( * ) Notice: Subject to any disclaimer, the term of this patent is extended or adjusted under 35 U.S.C. 154(b) by 183 days.

(21) Appl. No.: 18/635,390

(22) Filed: Apr. 15, 2024

(65) Prior Publication Data

US 2024/0349009 A1 Oct. 17, 2024

(30) Foreign Application Priority Data

Apr. 15, 2023 (EP) .................................... 23168140

(51) Int. Cl.
*H04S 7/00* (2006.01)
*H04S 3/00* (2006.01)

(52) U.S. Cl.
CPC .............. *H04S 7/307* (2013.01); *H04S 3/008* (2013.01); *H04S 2400/01* (2013.01); *H04S 2400/13* (2013.01)

(58) Field of Classification Search
CPC ...... H04S 7/307; H04S 3/008; H04S 2400/01; H04S 2400/13; H04S 3/04; H04S 3/007
See application file for complete search history.

(56) References Cited

U.S. PATENT DOCUMENTS

| | | | | |
|---|---|---|---|---|
| 9,794,689 B2 * | 10/2017 | You | .......................... | G10H 1/08 |
| 10,893,362 B2 * | 1/2021 | You | .......................... | H04R 3/04 |
| 2015/0312676 A1 * | 10/2015 | Ekstrand | .................. | H04R 1/22 381/98 |
| 2024/0045644 A1 * | 2/2024 | Welti | ...................... | G06F 3/165 |
| 2024/0155290 A1 | 5/2024 | Hiroe | | |

FOREIGN PATENT DOCUMENTS

| | | | |
|---|---|---|---|
| CN | 114067827 | 2/2022 | |
| CN | 114299976 | 4/2022 | |
| CN | 116072133 A * | 5/2023 | ........... G10L 21/003 |

(Continued)

OTHER PUBLICATIONS

R. Giampiccolo et al. “Virtual Bass Enhancement via Music Demixing,” IEEE Signal Processing Letters, vol. 30, pp. 908-912 (Jul. 19, 2023).

(Continued)

*Primary Examiner* — David L Ton
(74) *Attorney, Agent, or Firm* — Cook Alex Ltd.

(57) ABSTRACT

A virtual bass enhancing device for enhancing a virtual bass of an input audio signal includes a demixer, configured to extract at least one audio channel from the input audio signal, wherein the audio channel corresponds to an acoustic source, or to a group of acoustic sources, of the input audio signal, at least one virtual bass enhancing unit configured to generate overtones for enhancing a bass perception of the audio channel, and at least one adder configured to add the overtones to the input audio signal so as to generate an enhanced audio signal.

15 Claims, 4 Drawing Sheets

(56) References Cited

FOREIGN PATENT DOCUMENTS

| | | | | | |
|---|---|---|---|---|---|
| CN | 115442709 | B | * | 6/2023 | ............... H04R 3/00 |
| EP | 3811514 | B1 | * | 6/2023 | ............. H03G 5/165 |
| JP | 2014116657 | A | | 6/2014 | |
| JP | 2015195432 | A | | 11/2015 | |
| WO | WO2012161781 | | | 11/2012 | |
| WO | WO2021154211 | | | 8/2021 | |
| WO | WO2021161543 | | | 8/2021 | |
| WO | WO2022190615 | | | 9/2022 | |

OTHER PUBLICATIONS

M. Bai et al., "Synthesis and Implementation of Virtual Bass System with a Phase-Vocoder Approach," J. Audio Eng. Soc., vol. 54, No. 11, pp. 1077-1091 (Nov. 2006).
D. Ben-Tzur et al., "The Effect of the MaxxBass Psychoacoustic Bass Enhancement System on Loudspeaker Design," in Proceedings of the 106th Audio Engineering Society Convention (May 8, 1999) (11 pages).
European Broadcasting Union, R 128—Loudness Normalisation and Permitted Maximum Level of Audio Signals (Jun. 2014) (5 pages).
R. Giampiccolo et al., "A Time-Domain Virtual Bass Enhancement Circuital Model for Real-Time Music Applications," IEEE 24th International Workshop on Multimedia Signal Processing (MMSP) (Sep. 26-28, 2022) (5 pages).
A Hill et al., "A hybrid virtual bass system for optimized steady-state and transient performance," in Proceedings of the 2nd Computer Science and Electronic Engineering Conference (CEEC) (2010) (6 pages).
E. Larsen et al., Audio Bandwidth Extension: Application of Psychoacoustics, Signal Processing and Loudspeaker Design (2004) (313 pages).
E. Manilow et al.: "Cutting Music Source Separation Some Slakh: A Dataset to Study the Impact of Training Data Quality and Quantity" in IEEE Workshop on Applications of Signal Processing to Audio and Acoustics, pp. 45-49 (Oct. 20-23, 2019).
E. Moliner et al., "Virtual Bass System with Fuzzy Separation of Tones and Transients," in Proceedings of the 23rd International Conference on Digital Audio Effects (DAFx2020) pp. 86-93 (Sep. 2020).
H. Mu et al.: A Timbre Matching Approach to Enhance Audio Quality of Psychoacoustic Bass Enhancement System, pp. 36-40 (2013).
N. Oo et al., "Harmonic Analysis of Nonlinear Devices for Virtual Bass System," in Proceedings of the Int. Conf. Audio, Language, and Image Processing, pp. 279-284 (2008).
N. Oo et al., "Perceptually-Motivated Objective Grading of Nonlinear Processing in Virtual-Bass Systems," J. Audio Eng. Soc., vol. 59, No. 11, pp. 804-824 (Nov. 2011).

* cited by examiner

VIRTUAL BASS ENHANCEMENT BASED ON SOURCE SEPARATION

The present application claims priority to EP application Ser. No. 23/168,140.4, filed Apr. 15, 2023, which is hereby incorporated herein by reference.

The present invention relates to the field of audio signal processing. In particular, the invention relates to methods and devices for improving the audio characteristic in the bass region, or low-frequency region, of a loudspeaker.

STATE OF THE ART

Due to physical limitations, small-size loudspeakers are characterized by a poor acoustic response, especially at low frequency. Common small loudspeakers, such as those found in portable electronic devices like smartphones and laptops, exhibit a cut-off frequency around 150 Hz, for electrodynamic loudspeakers, or around 300 Hz, for piezo-electric loudspeakers. This impairs the reproduction of audio signals in the bass range, usually recognized to be the range from 20 Hz to 300 Hz, which is then lower than the cut-off frequency.

Common techniques based on linear filtering, such as equalization, might damage the transducer, introduce unwanted distortion, and, ultimately, are unable to solve the problem.

This problem has been addressed following two main approaches. On the one hand, new transducers have been developed to overcome such physical limitations, typically acting on the device design. On the other hand, signal processing algorithms have been developed to enhance the acoustic performance of the transducers. Within the latter approach, a class of digital signal processing algorithms is known as virtual bass enhancement, or VBE.

VBE dates back to the 90s when the idea of exploiting psychoacoustics effects was first addressed. In particular, several algorithms known in the prior art are based on the so-called missing fundamental phenomenon. According to this effect, the human brain can perceive low frequencies as present, thanks to the periodicity of its higher harmonics, even if the low frequency is not physically reproduced. That is, the human brain is able to reconstruct a missing fundamental starting from its higher harmonics.

Over the past few decades, different VBE algorithms have been proposed. They can be mainly divided into two categories: time-domain techniques and frequency-domain techniques.

Time-domain methods are simple, lightweight and perform well on transients. They typically rely on a crossover network for extracting the low end out of the audio track. Then, a Nonlinear Device, NLD, is applied to generate overtones; finally, the harmonically-enriched track is weighted and summed back to the high-pass version of the original signal to output the bass-enhanced audio track.

Time-domain VBE algorithms are known, for instance, from the following articles:

E. Larsen and R. M. Aarts, Audio Bandwidth Extension: Application of Psychoacoustics, Signal Processing and Loudspeaker Design. John Wiley and Sons, Ltd, 2004;

D. Ben-Tzur, "The effect of the maxxbass 1 psychoacoustic bass enhancement system on loudspeaker design," in Proceedings of the 106th Audio Engineering Society Convention, 5 1999, N. Oo, W. S. Gan, and M. O. J. Hawksford, "Perceptually-motivated objective grading of nonlinear processing in virtual-bass systems," Journal of the Audio Engineering Society, vol. 59, pp. 804-824, 12 2011, N. Oo and W. S. Gan, "Harmonic analysis of nonlinear devices for virtual bass system," in Proc. Int. Conf. Audio, Language, and Image Processing, 8 2008, pp. 279-284, R. Giampiccolo, A. Bernardini, and A. Sarti, "A Time-Domain Virtual Bass Enhancement Circuital Model for Real-Time Music Applications," IEEE 24th International Workshop on Multimedia Signal Processing (MMSP), Shanghai, China, 26-28 Sep. 2022.

Frequency-domain approaches, instead, are based on phase vocoders and perform well on the tonal components rather than on transients. They generally apply pitch-shifting for mapping frequencies that are originally below the cut-off of the transducer to higher regions of the frequency spectrum. The newly introduced harmonics are then weighted either following the frequency envelope or following the equal-loudness contour.

Finally, in order to merge the advantages of the two approaches, hybrid techniques have been proposed. These techniques aim at applying time-domain methods to transients and frequency-domain methods to tonal parts of audio tracks. This is typically achieved by applying such a separation in the frequency domain. Hybrid techniques are often characterized by a high computational cost that prevents them from being applied in real-time scenarios.

Frequency-domain and hybrid VBE algorithms are known, for instance, from the following articles:

M. R. Bai and W. C. Lin, "Synthesis and implementation of virtual bass system with a phase-vocoder approach," Journal of the Audio Engineering Society, vol. 54, pp. 1077-1091, 2006.

E. Moliner, J. Ramo, and V. Valimaki, "Virtual bass system with fuzzy separation of tones and transients," in Proceedings of the 23rd International Conference on Digital Audio Effects (DAFx2020), 9 2020.

A. J. Hill and M. O. J. Hawksford, "A hybrid virtual bass system for optimized steady-state and transient performance," in Proceedings of the 2nd Computer Science and Electronic Engineering Conference (CEEC), 9 2010, pp. 1-6.

However, known time-domain techniques suffer from Intermodulation Distortion, or IMD. In particular, feeding a nonlinear function, such as an NLD, with a lowpass version of the original audio track, for instance a polyphonic mixture of instruments, creates overtones for multiple frequency components at once, inevitably leading to the generation of unpleasant inharmonic distortion.

Frequency-domain techniques, on the other hand, suffer from the smearing effect caused by frame-by-frame processing, which, in turn, negatively affects the perception of transients and onsets by reducing the temporal resolution. Additionally, although characterized by better control over the harmonic generation, they are typically computationally demanding.

There is therefore a need for improved virtual bass enhancement algorithms capable of creating, in the listener, the perception of low-frequency sounds which are below the physical capability of the loudspeaker, without introducing distortion in the signal and with a manageable computational complexity.

SUMMARY

In general, the present invention is based on the consideration that virtual bass enhancing techniques known in the art can be improved by applying them to selected parts of the input audio signal instead of applying them to the complete audio signal. Even more specifically, the invention is based on how those selected parts are extracted from the input audio signal.

In particular, contrary to methods known in the prior art which act on parts of the input audio signal, for instance a low-passed signal yielded by a cross-over network, the invention applies VBE to isolated music stems. In other words, the invention relates to applying VBE to isolated sound sources, or groups thereof, that share a common sound production mechanism, for instance multiple vocal lines, percussions, string ensemble, etc. In other words, the invention is characterized by the selection of which component are subjected to VBE independently of the others. This, as will become clearer from the following description, can be advantageously obtained by using a Music Demixing Model to extract such components. In this manner, the intermodulation distortion can be avoided.

Moreover, different pre- and post-processing stages can be added to the signal processing pipeline, which can additionally improve the bass enhancement.

An embodiment can therefore relate to a virtual bass enhancing device for enhancing a virtual bass of an input audio signal, the virtual bass enhancing device comprising a demixer, configured to extract at least one audio channel from the input audio signal, wherein the audio channel corresponds to an acoustic source, or to a group of acoustic sources, of the input audio signal, at least one virtual bass enhancing unit configured to generate overtones for enhancing a bass perception of the audio channel, and at least one adder configured to add the overtones to the input audio signal so as to generate an enhanced audio signal.

In some embodiments, the demixer can comprise at least one neural network trained to extract at least one audio channel from the input signal.

In some embodiments, the demixer can comprise a plurality of neural networks trained to extract a respective plurality of audio channels from the input signal.

In some embodiments, the virtual bass enhancing device can further comprise at least one filter configured to filter at least one audio channel and output at least one filtered audio channel, wherein at least one virtual bass enhancing unit can be configured to generate overtones for enhancing the bass perception of the filtered audio channel.

In some embodiments, wherein the virtual bass enhancing unit can be a time-domain virtual bass enhancing unit.

In some embodiments, at least one filter can be a linear-phase digital filter, or a zero-phase digital filter.

In some embodiments, the virtual bass enhancing device can further comprise at least one subtractor configured to subtract at least one filtered audio channel from the input audio signal.

In some embodiments, at least one virtual bass enhancing unit can comprise a normalization unit, a non-linear device, and a gain unit.

In some embodiments, at least one virtual bass enhancing unit can be configured to implement at least a function $f(x)$ having a continuous first derivative and second derivative having a value smaller than 1 in the interval (0,1].

In some embodiments, at least one virtual bass enhancing unit can be configured to implement at least a function $f(x)=\tanh(kx)$ where k is a predetermined value, preferably equal to, and/or larger than 1.

In some embodiments, at least one virtual bass enhancing unit can be configured to implement at least a function $f(x)$ $$f(x) = \begin{cases} atsr(x) & \text{if } x \geq 0 \\ \tanh(kx) & \text{if } x < 0 \end{cases}$$

where

"k" is a constant value equal to 2.25;

"tanh" is the hyperbolic tangent function;

and "atsr" is the Arc-Tangent Square Root function.

In some embodiments, the virtual bass enhancing device can further comprise a high-pass filter, receiving as input the enhanced audio signal and outputting a filtered enhanced audio signal, a peak normalizer, and a loudness normalizer, operating on the filtered enhanced audio signal.

In some embodiments, the virtual bass enhancing device can be configured to be used with a transducer having a cut-off frequency, and the high-pass filter can have a cut-off frequency corresponding to the transducer cut-off frequency.

In some embodiments, the acoustic source comprises any of drum, vocal or a musical instrument.

DETAILED DESCRIPTION OF THE DRAWINGS

Figure 1:
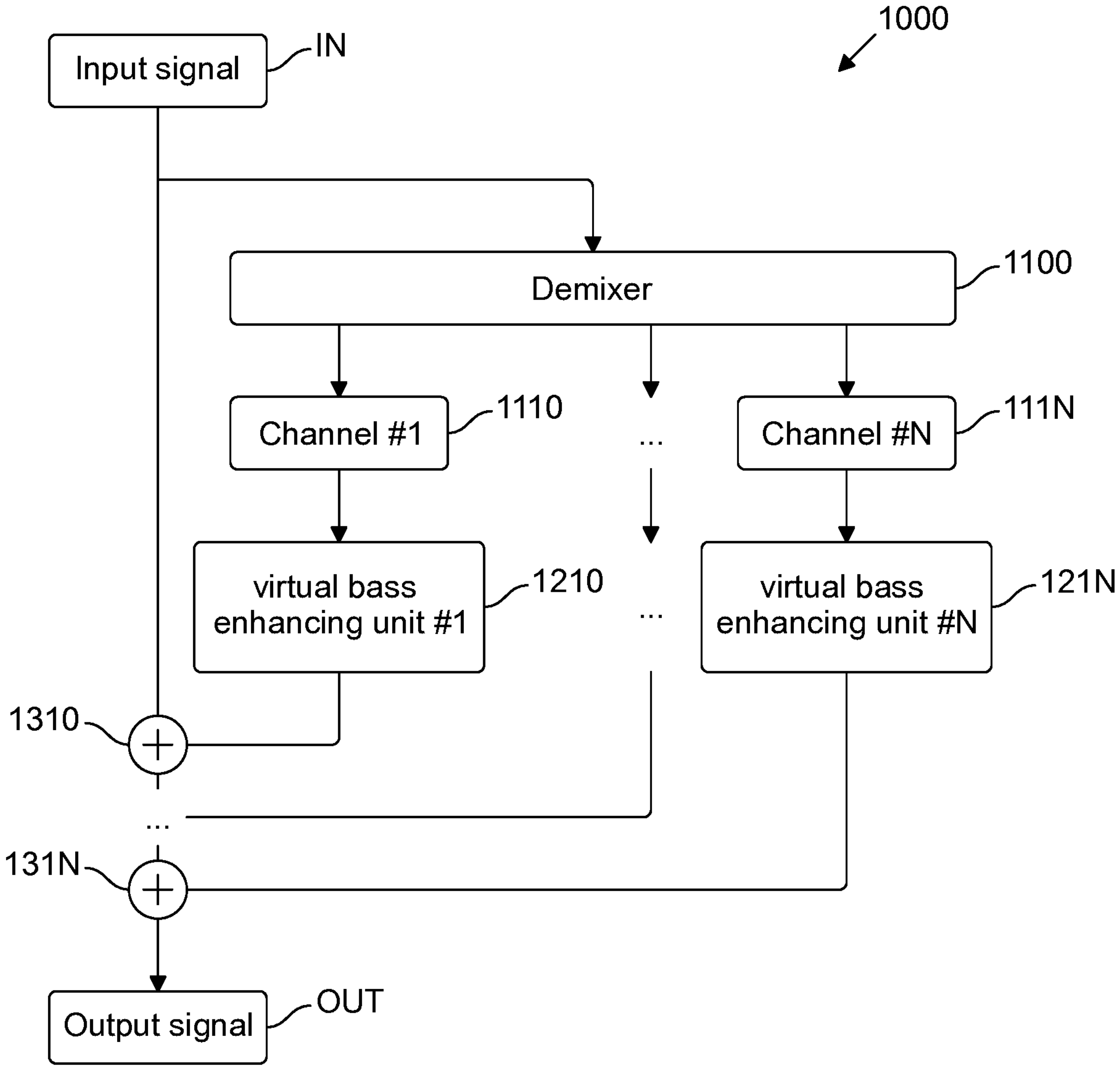
FIG. 1 schematically illustrates a virtual bass enhancing device 1000.

FIG. 1 schematically illustrates a virtual bass enhancing device 1000. The virtual bass enhancing device 1000 is generally configured to enhance a virtual bass of an input audio signal IN. The input audio signal IN can be an analog or a digital signal, those skilled in the art will understand that the components, such as filters, described in the following, can then be configured accordingly.

The input audio signal IN generally is the result of a plurality of acoustic sources combined in a single audio signal. For instance, a band comprising drums, bass, guitars, and vocals can record an audio track which will be the resulting combination of those acoustic sources. In the context of this application, the term acoustic sources can therefore be for instance understood as being corresponding to a musical instrument or a voice, physical or synthetized.

In preferred embodiments, the acoustic source can comprise any of drums, vocal or a musical instrument. In particularly preferred embodiments, the acoustic source can comprise the drums. In particularly preferred embodiments, the acoustic source can comprise any musical instrument with a majority of their spectral energy located at frequencies lower than 500 Hz, preferably lower than 250 Hz. Alternatively, or in addition, in particularly preferred embodiments, the acoustic source can comprise any musical instrument with a peak emission frequency lower than 500

Hz, preferably lower than 250 Hz. The peak emission frequency can be understood as the emission frequency with the highest amplitude. Still alternatively, or in addition, in particularly preferred embodiments, the acoustic source can comprise any musical instrument with a fundamental frequency, and even more preferably with their main fundamental frequency lower than 500 Hz, preferably lower than 250 Hz, where the main fundamental frequency can be understood as, in case of a plurality of fundamental frequencies, the one with the largest amplitude.

As will become clearer in the following, in contrast with the prior art, in which a VBE processing is applied to the entire input audio signal IN, or to components thereof resulting from various type of filtering, the present invention introduces the innovative aspects of separating at least one acoustic source from the input audio signal IN and applying VBE processing on the resulting separated at least one acoustic source.

In order to do so, the virtual bass enhancing device 1000 comprises a demixer 1100. The demixer 1100 is generally configured to extract at least one audio channel 1110-111N from the input audio signal IN. The audio channel 1110-111N can correspond to a single acoustic source, for instance the drums, or the bass guitar, or to a group of acoustic sources, for instance all drums and cymbals in a drum kit, of the input audio signal IN. It will be clear that de-mixing a single acoustic source in a given audio channel 1110-111N allows more flexibility and granularity in the signal processing, and particularly the VBE processing, which can be applied to the specific acoustic source. Conversely, including a plurality of acoustic sources in a single audio channel, for instance drums and basses, might result in less granularity but reduced computational resources.

It will be clear to those skilled in the art that several manners are available for de-mixing input audio signal IN into a plurality of audio channels. In the following preferred embodiments, use of one or more trained neural network will be described for the demixer 1100, it will however be clear that the invention is not limited thereto.

The virtual bass enhancing device 1000 further comprises at least one virtual bass enhancing unit 1210-121N, preferably a time-domain virtual bass enhancing unit 1210-121N although the invention is not limited thereto and frequency-domain VBE units could be used instead, configured to generate overtones for enhancing a bass perception of the audio channel 1110-111N. Preferably, the number of virtual bass enhancing unit 1210-121N corresponds to the number of audio channels 1110-111N, or is lower than the number of audio channels 1110-111N, in case the generation of overtones for enhancing the virtual bass is desired only on some of the audio channels 1110-111N.

It will be clear to those skilled in the art that several manners are available for generating overtones with the aim of enhancing, or improving, the bass characteristic of a signal. Even when limiting to time-domain VBE algorithms, several such algorithms are available. It will be clear that any of those, unless indicated otherwise or unless technically incompatible with other elements, can be employed in the invention.

The virtual bass enhancing device 1000 further comprises at least one adder 1310-131N configured to add the overtones to the input audio signal IN so as to generate an enhanced audio signal OUT. Preferably, the number of adders 1310-131N corresponds to the number of audio channels 1110-111N. In this manner, the enhanced audio signal OUT can comprise the various audio channels 1110-111N after one or more of those has been processed via a VBE algorithm.

In other words, the embodiment of FIG. 1 allows separating, or de-mixing, the input audio signal IN into a plurality of audio channels corresponding to various acoustic sources, applying a VBE processing to at least one of those audio channels, and combining again the audio channels, preferably all of them, to obtain the enhanced audio signal OUT.

Thanks to this approach, it is advantageously possible to avoid the generation of unpleasant inharmonic distortion, IMD, since the overtones from the VBE processing are generated independently for a given acoustic source, or for a group of acoustic sources which is found to generate acceptable levels of inharmonic distortion, IMD, when applied to VBE processing together.

This approach therefore overcomes one of the main disadvantages of known VBE algorithms, any in particular of time-domain based techniques, while maintaining all advantages thereof, and in particular the low computation requirements and their operation on transients.

As indicated above, various manners are known to those skilled in the art for de-mixing an audio signal into a plurality of channel based on the respective acoustic, or instrumental, sources. In preferred embodiments of the invention, the demixer 1100 can comprise at least one neural network trained to extract at least one audio channel 1110-111N from the input signal IN.

This approach is particularly advantageous, as it has been found that neural networks are particularly effective at correctly separating different acoustic sources into different respective channels.

Moreover, while a single neural network can be trained to recognize and separate a plurality of acoustic sources, it has been found that the separation of various acoustic sources can be successfully operated by a plurality of neural networks, each one trained to recognize and separate one, or more, acoustic sources. Thus, in some embodiments, the demixer 1100 can comprise a plurality of neural networks trained to extract a respective plurality of audio channels 1110-111N from the input signal IN. Preferably, a plurality, preferably all, of the neural networks can each be trained to recognize and separate a single corresponding acoustic source.

In this manner, it is advantageously possible to train one neural network per audio channel 1110-111N such as one for vocals, another one for drums, yet another for bass, etc. This has been found to be particularly advantageous since the type of training required for recognizing one acoustic source, such as vocals, is often different than the type of training required for recognizing another acoustic source, such as drums.

In preferred embodiments, a higher number of channels is preferred to a lower number of channels. In fact, separating the input signal IN into a higher number of channels generally enables finer control over the processing applied to each individual instrument, or acoustic source, or stem. In principle, the number of channels in existing de-mixing models is limited solely by the availability of training data, and de-mixers are not inherently limited to a certain set of musical instruments. It is however noted that not all instruments contain significant energy in the low-end, or bass, part of the frequency spectrum. Those instruments, or acoustic sources, may therefore be relegated to a single “other” channel, with little to no impact on the proposed system.

Figure 2:
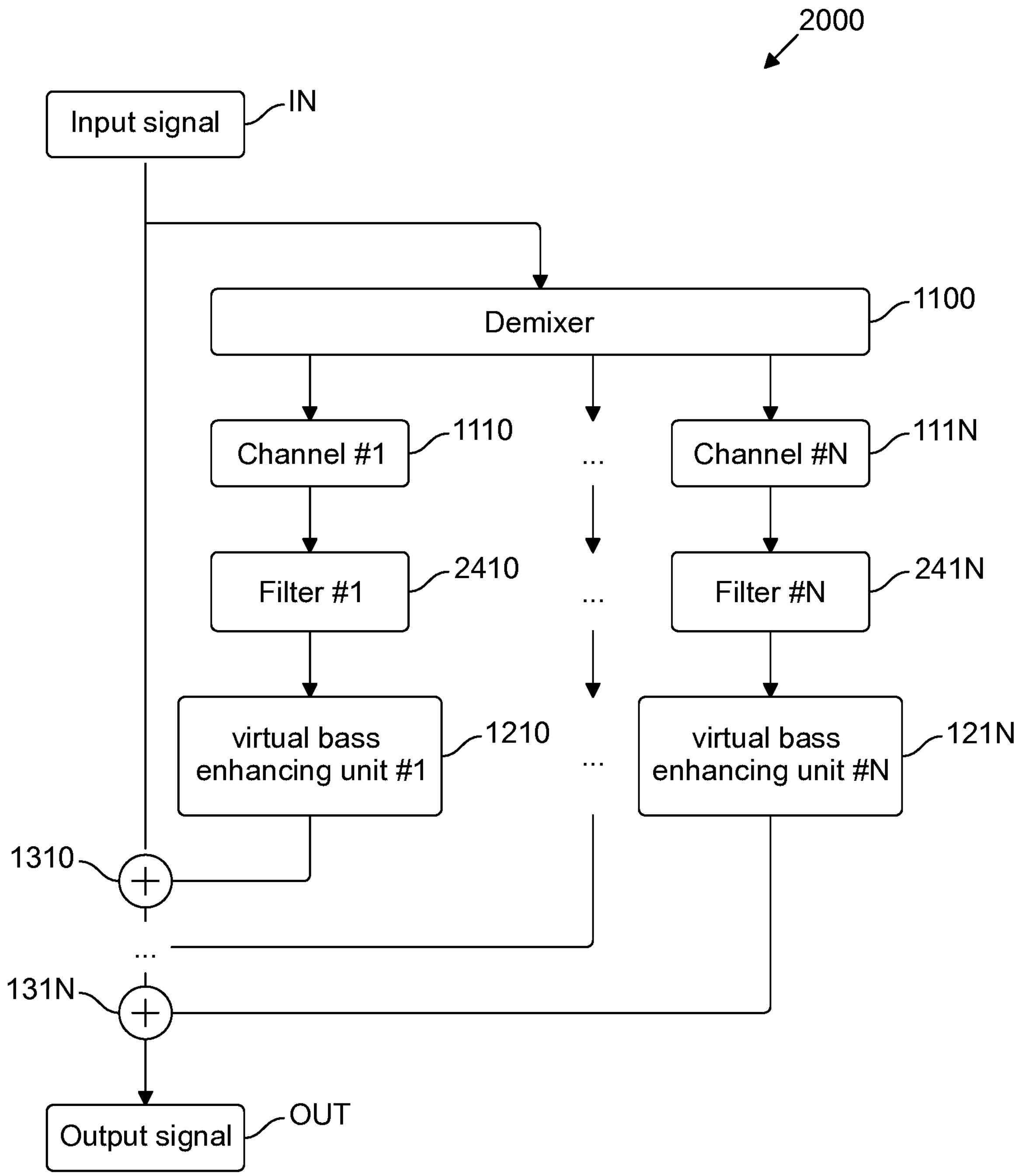
FIG. 2 schematically illustrates a virtual bass enhancing device 2000 which differs from virtual bass enhancing device 1000 due to further comprising a plurality of filters 2410-241N.

FIG. 2 schematically illustrates a virtual bass enhancing device 2000 which differs from virtual bass enhancing device 1000 due to further comprising a plurality of filters 2410-241N.

In particular, the virtual bass enhancing device 2000 further comprises at least one filter 2410-241N configured to filter at least one respective audio channel 1110-111N and output a respective filtered audio channel 1110-111N. The corresponding virtual bass enhancing unit 1210-121N can then be configured to operate, for instance to generate overtones for enhancing the bass perception, on the respective filtered audio channel 1110-111N.

Thanks to this specific approach, the overtones can be generated for specific part of the audio channels 1110-111N, for instance a part more associated with the basses. The filters 2410-241N can be configured according to the sound characteristics of the specific channel. For instance, in preferred embodiments, a low-pass filter can be used for extracting the low-end out of a drum channel audio. Alternatively, or in addition, a flat transfer function can be used for other channels. That is, no filtering can be applied. In some cases, this could be advantageous because one may want to operate on the entire frequency spectrum of the respective channel. It will be clear that the same result can be obtained by removing the filter 2410-241N.

In some preferred embodiments, the virtual bass enhancing unit 1210-121N, 4210 is a time-domain virtual bass enhancing unit 1210-121N, 4210. As mentioned, frequency-domain virtual bass enhancing units could also be used for the virtual bass enhancing unit 1210-121N, 4210. In some further embodiments, some of the virtual bass enhancing unit 1210-121N, 4210 could be time-domain based while some could be frequency-domain based.

Preferably, at least one filter 2410-241N, preferably a majority of them, even more preferably all of them, is a linear-phase digital filter, or a zero-phase digital filter. This is particularly advantageous as it avoids introducing phase distortion that could alter the shape of the waveforms, thus hindering the result of downstream operations such as the addition or subtraction of signals, for instance through the adders 1310-131N.

Figure 3:
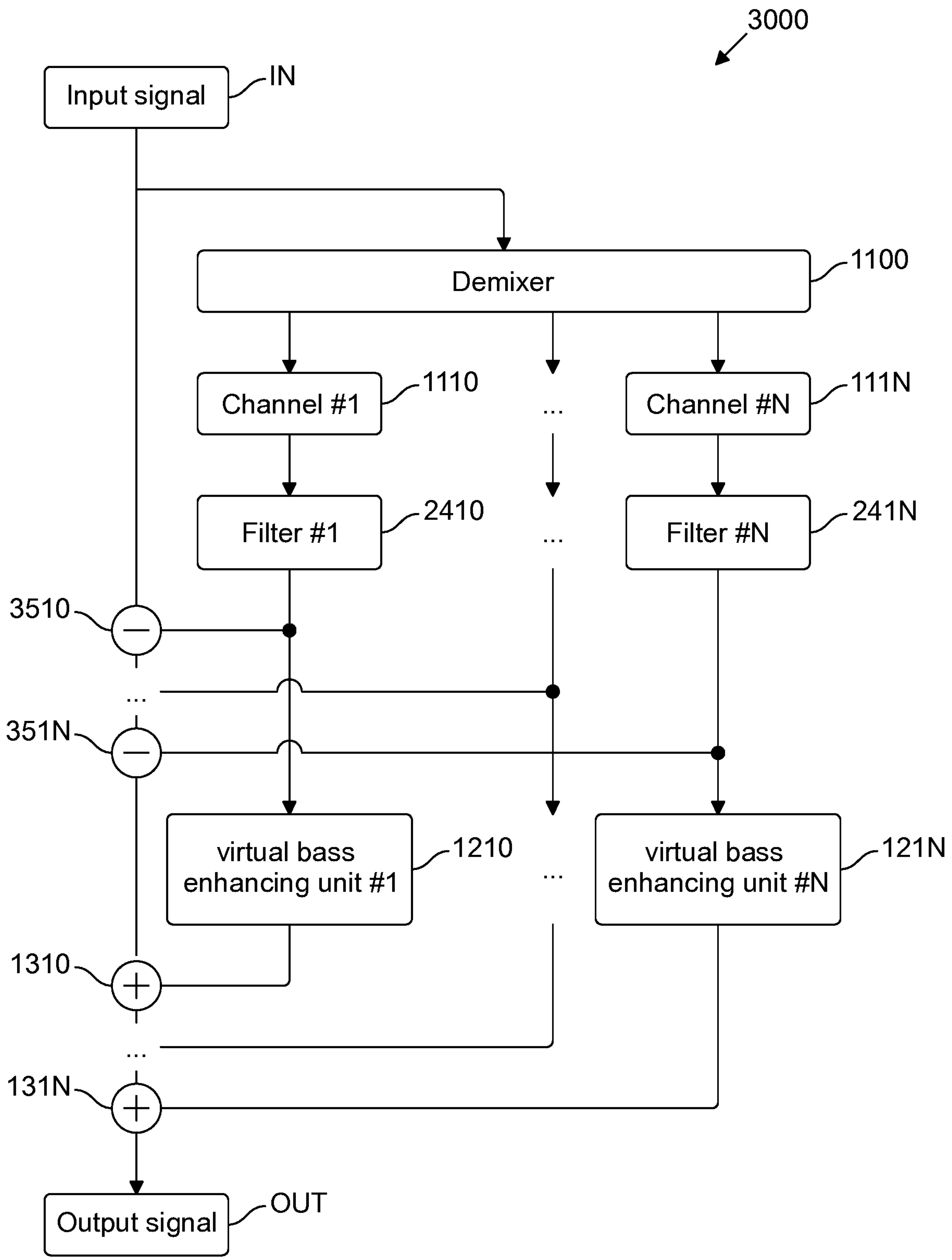
FIG. 3 schematically illustrates a virtual bass enhancing device 3000 which differs from virtual bass enhancing device 2000 due to further comprising a plurality of subtractors 3510-351N.

FIG. 3 schematically illustrates a virtual bass enhancing device 3000 which differs from virtual bass enhancing device 2000 due to further comprising at least one subtractor 3510-351N.

In particular, at least one subtractor 3510-351N can be configured to subtract at least one filtered audio channel 1110-111N from the input audio signal IN, preferably before the filtered audio channel 1110-111N, or the filtered audio channel 1110-111N as processed by the respective virtual bass enhancing unit, is added again to the input audio signal IN.

Thanks to this approach, it is advantageously possible to avoid taking into account the filtered audio channel 1110-111N twice. Moreover, particularly in the embodiments where the filters 2410-241N are low-pass filters, low-frequency components of the audio signal can be used for the VBE processing but are not themselves comprised in the enhanced audio signal OUT.

In the embodiments described so far, it has been described that in principle any known virtual bass enhancing algorithm can be used for the virtual bass enhancing units 1210-121N, and preferably a time-domain algorithm. In addition to this, FIG. 4 schematically illustrates a virtual bass enhancing unit 4210, which can implement any of the virtual bass enhancing units 1210-121N.

Figure 4:
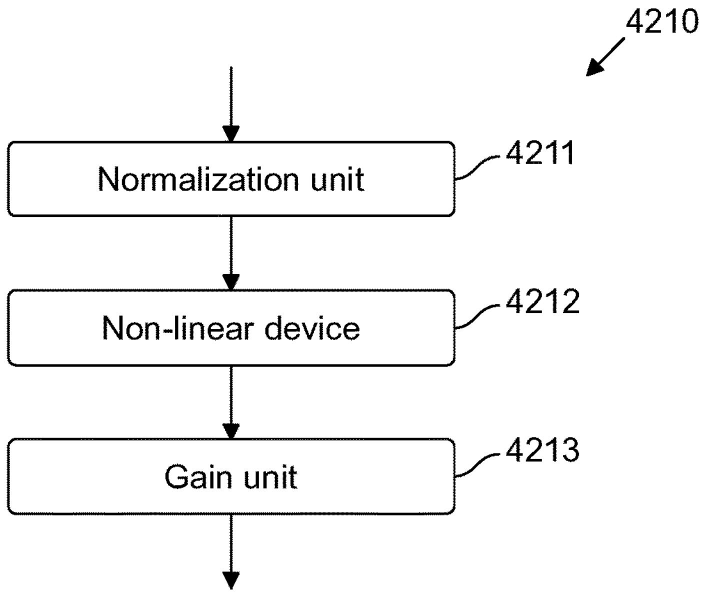
FIG. 4 schematically illustrates a virtual bass enhancing unit 4210.

More specifically, as visible in FIG. 4, the virtual bass enhancing unit 4210 comprises any of a normalization unit 4211, a non-linear device 4212 and a gain unit 4213. It will be clear that any of those elements can be implemented also without the others.

The purpose of the normalization unit 4211 is generally to normalize the signal, preferably within a given time window. This is advantageous because it allows an improved driving of the non-linear device, NLD, 4212. In particular, the NLD 4212 can generate a lesser amount of harmonics, in number and/or amplitude, if the input signal takes values in the range for which its nonlinear behavior is less pronounced, also known as quasi-linear region. On the contrary, signals that span the range for which the nonlinear behavior of the NLD is more pronounced undergo a greater deal of harmonic enhancement.

Thus, in preferred embodiments, the normalization unit 4211 can generally be configured to normalize the signal so that the normalized signal has values not limited to the quasi-linear region of the NLD 4212, preferably so that the normalized signal has values outside of the quasi-linear region of the NLD 4212.

In preferred embodiments, this can be obtained by normalizing the input signal on a frame-by-frame basis. For instance, in the case of a digital implementation, the normalization can be applied to all digital samples within a time window of length M, sliding over the input signal, possibly one sample at a time, as new samples are to be processed. That is, the normalization can be executed across samples of a time-sliding window of a predetermined duration. This determines a time-varying normalization in which the parameters of the normalization depend on the M past samples and thus are updated over time. It will be clear that, within the given window, a plurality of normalization algorithms can be employed.

In some preferred embodiments, the normalization unit 4211 can be implemented by an adaptive rescaling. For instance, in a possible implementation the normalization unit 4211 can be configured to divide the input sample for the maximum absolute value of the past M samples, so that the extremum of the short-time signal within the window is ±1. The normalization unit 4211 can be further configured to multiply each sample thus obtained by a predetermined positive value, so as to ensure that the signal takes values in a desired range, and in particular outside the quasi-linear region of the NLD 4212.

In some further preferred embodiments, the normalization applied to the current window may depend, at least in part, also on the rescaling parameters of previous windows. For instance, an exponential moving average update rule can be used. In this manner the normalization strength, and thus the harmonic enhancement due to the following NLD, does not abruptly change for one window compared to the previous ones. In preferred embodiments, any of the time windows described above can have a length of several seconds, for instance at least 2 s.

Non-linear device 4212 can be configured to implement a nonlinear function $f(x)$, preferably instantaneous, that, for instance in a digital implementation, takes as input samples of a signal $x[k]$, for instance the output of normalization unit 4211, and outputs the processed sample $y[k]$, where $y[k]=f(x[k])$ and k is the time index. In preferred embodiments, where the nonlinear function is instantaneous, each sample of $x[k]$, for all k, is processed independently of the others.

Various formulations for the nonlinear function $f(x)$ can be implemented and, in fact, several are known from the prior art. In addition thereto, it has been found that a NLD function having a continuous first derivative and second derivative having a value smaller than 1 in the interval (0,1], has been found to perform better for devices characterized by a low cut-off frequency, such as electrodynamic loudspeakers.

A particularly advantageous example of a NLD function $f(x)$ is tanh (kx), where k is a predetermined value, preferably equal to, and/or larger than 1.

The above formulations have been furthermore found to be particularly effective when applied to small-size electrodynamic loudspeakers. At the same time, it has also been found that they are very well suited to piezoelectric transducers. In particular, the specific implementation with tanh has been found to lead to a stronger bass enhancement, and preferably for piezoelectric-based transducers. This is because piezoelectric transducers tend to have a higher cut-off frequency and it has been found that employing a NLD function $f(x)$ characterized by a two-sided saturating behavior, and thus able to generate a greater deal of harmonics, improves the VBE effect, compared to electrodynamic loudspeakers. In this context, the term "two-sided" can be understood as referring to a saturation of both positive and negative half-waveforms. The use of tanh (x) has been found to offer a particularly advantageous trade-off between perceptual bass enhancement and audible distortion when fed with higher amplitude signals. This is believed to be due to the fact that tanh (x) is more akin to a typical saturation unit, such as a symmetric diode clipping and/or overdrive unit, often found in music processing.

As a further example of f(x), the following formulation has been found to be particularly effective $$f(x) = \begin{cases} atsr(x) \text{ if } x \geq 0 \\ \tanh(kx) \text{ if } x < 0 \end{cases}$$

where

"k" is a constant value equal to 2.25;

"tanh" is the hyperbolic tangent function;

and "atsr" is the Arc-Tangent Square Root function.

This implementation has been found to be particularly advantageous since it avoids a highly unbalanced weighing of positive and negative half-waveforms. In general, an uneven weighing of positive and negative half-waveforms is not per se negative. In fact, asymmetric functions are often preferable as far as VBE is concerned. However various NLD functions from the prior art have highly unbalanced effect on positive and negative half-waveforms, in favor of one over the other. In contrast thereto, one advantage of the NLD function described above is that it does not disproportionately amplify one half-waveform with respect to the other.

One further advantage is that the NLD function is asymmetrical and thus able to generate both even and odd harmonics. In fact, the missing fundamental phenomenon is triggered more effectively when both even and odd harmonics are present.

The gain unit 4213 can be configured to multiply its input, for instance the output of the NLD 4212, by predetermined gain value to adjust its amplitude, which allows for controlling of the level of the processed audio component.

In some preferred embodiments, the gain value can be a function of the normalization parameters found in unit 4211. In preferred implementation, the gain value can be configured to reduce the level of a signal that has undergone a more significant harmonic generation compared to a signal in a prior, and/or, in a subsequent time window.

It is therefore clear from the description above that the invention allows extracting a plurality of acoustic sources from the input signal IN separately from each other. This, in turn, allows those acoustic sources to be processed separately, and thus also differently. This allows a higher degree of modularity, or granularity, and control with respect to the prior art.

Such granularity can be applied to any part of the signal processing chain. For instance, depending on the spectral content of a given channel 1110-111N, it is possible to appropriately configure an ideal filter 2410-241N. Alternatively, or in addition, it is possible to operate the normalization unit 4211 differently for different acoustic sources, since the normalization is configured to operate on the various signals independently, which are likely to differ from each other.

Additionally, depending on the music track under consideration, the separation of the acoustic sources in independent channels enables the application of a given NLD function to a given channel, and of a different NLD function to another channel, at the non-linear devices 4212. In particular, NLD characteristics can be selected with respect to the transducer for which the VBE system is designed. More specifically, they can be selected among the nonlinearities that best suit the acoustic source of the given channel, for instance with respect to the number, type, amplitude, energy, etc. of the introduced harmonics.

Still further, also gain units 4213 can operate differently for different channels. This allows the invention to further tune and adjust the bass enhancement channel-wise.

For instance, in preferred embodiments, the drums channel can be processed by applying a low-pass filter, while other filters 241N can be configured to have a unitary flat transfer function. This might be preferably also for acoustic sources which are generally associated to bass perception, such as the bass channel, which the inventors have found to be advantageously processed in its entirety, in some embodiments, instead of focusing on a sub-band of its spectrum.

The de-mixing of the input signal IN into a plurality of channels therefore allows the designer of the virtual bass enhancing device to configure a VBE algorithm tailored to the perceptual and timbral characteristics of each acoustic source, independently from the others. This not only provides the advantage of reducing IMD, but it also allows more flexibility and granularity in the selection of specific VBE algorithms, at the units 1210-121N, or 4210, which are best suited for the respective acoustic source.

Figure 5:
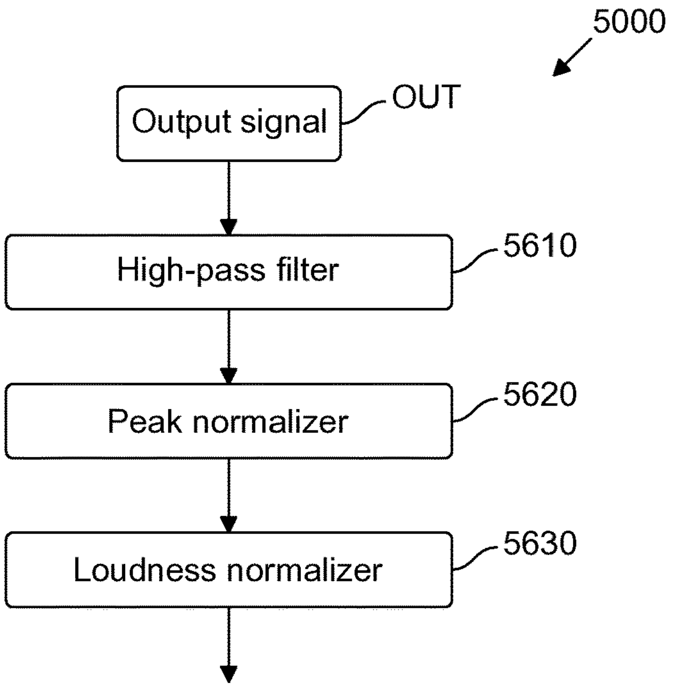
FIG. 5 schematically illustrates a virtual bass enhancing device 5000 which differs from any of virtual bass enhancing devices 1000, 2000, 3000 due to further comprising post-processing components 5610, 5620, 5630.

FIG. 5 schematically illustrates a virtual bass enhancing device 5000 which differs from any of virtual bass enhancing devices 1000, 2000, 3000 due to further comprising post-processing components 5610, 5620, 5630 for post-processing the enhanced audio signal OUT. It will be clear that, while described together in a single embodiment, any of those components can be implemented in isolation from the other and/or any combination of those components can be implemented.

In particular, the virtual bass enhancing device 5000 as illustrated comprises the element of any of the virtual bass enhancing devices previously described for generating the enhanced audio signal OUT, and a high-pass filter 5610, receiving as input the enhanced audio signal OUT and outputting a filtered enhanced audio signal In preferred embodiment, the virtual bass enhancing device is configured to be used with a transducer having a cut-off frequency, and the high-pass filter 5610 can be set to have a cut-off frequency preferably equal to the transducer cut-off frequency. This is particularly advantageous because the frequencies removed by the high-pass filter 5610 would not be adequately reproducible by the speaker, at least not with a proper level and/or without significant distortion. Additionally, the removal of those frequency components is advantageous so that those frequency components do not affect the subsequent normalization. The cut-off frequency of a transducer, and particularly of a small-sized transducer, can be understood as being the frequency below which the transducer cannot operate properly. It can be understood as a minimum output frequency.

The virtual bass enhancing device 5000 as illustrated further comprises a peak normalizer 5620 and/or a loudness normalizer 5630, operating on the filtered enhanced audio signal. Those elements might employ any known algorithms for normalizing the peaks and the loudness.

Any of those normalizations, and in particular their combination, avoids clipping and/or ensures that the perceived loudness remains that of the original track. Moreover, they avoid abrupt energy bursts which may damage the speaker.

In particular, is one purpose of the VBE to introduce newly generated harmonics in the signal, which provides the listener with the feeling of a bass frequency which is not being played. This, in turn, increases the energy of the signal. Driving a loudspeaker, especially if small sized, with a high-energy signal might stress the mechanical components of the transducer and eventually cause damage and breakage. Damages can also be caused by a high distortion generated by a naïve boost of the low frequency amplitudes such as that obtained via additive equalization. This is even more problematic when the energy increments happen in bursts.

An example can be the kick drum in a music track. Kick drum hits contain much low-end and thus correspond to a large amount of generated harmonic content. Including these harmonics in the enhanced signal increases the energy every time the kick drum is played, causing abrupt mechanical excitement that could damage the loudspeaker.

Applying peak and loudness normalization addresses this problem, and can be implemented as an embodiment of the invention. However, doing so without any signal filtering would also result in an overall volume drop, since the energy in the frequency range that the transducer cannot reproduce is accounted for in the normalization process.

Therefore, in preferred embodiments, the energy from the frequency bands that the transducer cannot reproduce is advantageously removed by the filter 5610. The resulting signal is then normalized with peak and/or loudness normalization. This ensures that the transducer is not driven with excessively high amplitude signals. At the same time, since the signal is filtered by 5610, the normalization in units 5620 and/or 5630 is not affected by those frequency components. This allows the invention to achieve a louder signal than in the absence of high-pass filter 5610.

In further preferred embodiments, the normalization in units 5620 and/or 5630 can be configured so that the sound pressure level (SPL) of the normalized audio signal is the same as that of the input audio signal IN.

In the embodiments above, the device can be understood to be implementable by physical components and/or software. In a purely software implementation, the virtual bass enhancing device can thus comprise a processor and a memory, and the memory can comprise instructions to cause the processor to implement any of the units or elements previously described.

It has thus been described how various embodiments can be implemented to achieve an improved virtual bass enhancing processing. While the various embodiments have each been described specific features, it will be clear to those skilled in the art that one or more features of any embodiment can be combined with one or more features from any other embodiment, and in particular in isolation from the remaining features of the respective embodiments

LIST OF REFERENCE NUMERALS

1000: virtual bass enhancing device
1100: demixer
1110-111N: audio channel
1210-121N: virtual bass enhancing unit
1310-131N: adder
IN: input audio signal
OUT: enhanced audio signal
2000: virtual bass enhancing device
2410-241N: filters
3000: virtual bass enhancing device
3510-351N: subtractor
4210: virtual bass enhancing unit
4211: normalization unit
4212: non-linear device
4213: gain unit
5000: virtual bass enhancing device
5610: high-pass filter
5620: peak normalizer
5630: loudness normalizer.

What is claimed is:

1. A virtual bass enhancing device for enhancing a virtual bass of an input audio signal, the virtual bass enhancing device comprising:
- a demixer, configured to extract at least one audio channel from the input audio signal, wherein the at least one audio channel corresponds to an acoustic source, or to a group of acoustic sources, of the input audio signal,
- at least one virtual bass enhancing unit configured to generate overtones for enhancing a bass perception of the at least one audio channel,
- at least one adder configured to add the overtones to the input audio signal so as to generate an enhanced audio signal.

2. The virtual bass enhancing device according to claim 1, wherein the demixer comprises at least one neural network trained to extract the at least one audio channel from the input audio signal.

3. The virtual bass enhancing device according to claim 1, wherein the demixer comprises a plurality of neural networks trained to extract a respective plurality of audio channels from the input audio signal.

4. The virtual bass enhancing device according to claim 1, further comprising:
- at least one filter configured to filter the at least one audio channel and output at least one filtered audio channel,
- wherein at least one virtual bass enhancing unit is configured to generate overtones for enhancing the bass perception of the at least one filtered audio channel.

5. The virtual bass enhancing device according to claim 1, wherein the virtual bass enhancing unit is a time-domain virtual bass enhancing unit.

6. The virtual bass enhancing device according to claim 4, wherein the at least one filter is a linear-phase digital filter, or a zero-phase digital filter.

7. The virtual bass enhancing device according to claim 4, further comprising at least one subtractor configured to subtract the at least one filtered audio channel from the input audio signal.

8. The virtual bass enhancing device according to claim 1, wherein the at least one virtual bass enhancing unit comprises a normalization unit, a non-linear device, and a gain unit.

9. The virtual bass enhancing device according to claim 1, wherein the at least one virtual bass enhancing unit is configured to implement at least a function $f(x)$ having a continuous first derivative and second derivative having a value smaller than 1 in the interval (0,1].

10. The virtual bass enhancing device according to claim 9, wherein the at least one virtual bass enhancing unit is configured to implement at least a function $f(x)=\tanh(kx)$ where k is a predetermined value, preferably equal to, and/or larger than 1.

11. The virtual bass enhancing device according to claim 9, wherein the at least one virtual bass enhancing unit is configured to implement at least a function $f(x)$:

$$f(x) = \begin{cases} atsr(x) & \text{if } x \geq 0 \\ \tanh(kx) & \text{if } x < 0 \end{cases}$$

where

"k" is a constant value equal to 2.25;

"tanh" is the hyperbolic tangent function;

and "atsr" is the Arc-Tangent Square Root function.

12. The virtual bass enhancing device according to claim 1, further comprising:

a high-pass filter, receiving as input the enhanced audio signal and outputting a filtered enhanced audio signal, a peak normalizer and a loudness normalizer, operating on the filtered enhanced audio signal.

13. The virtual bass enhancing device according to claim 12, wherein the virtual bass enhancing device is configured to be used with a transducer having a cut-off frequency, the high-pass filter has a cut-off frequency corresponding to the transducer cut-off frequency.

14. The virtual bass enhancing device according to claim 1, wherein the acoustic source comprises any of drum, vocal or a musical instrument.

15. A virtual bass enhancing device for enhancing a virtual bass of an input audio signal, the virtual bass enhancing device comprising a processor and a memory, the memory comprising instructions to cause the processor to implement a demixer, configured to extract at least one audio channel from the input audio signal, wherein the at least one audio channel corresponds to an acoustic source, or to a group of acoustic sources, of the input audio signal, the memory further comprising instructions to cause the processor to implement at least one virtual bass enhancing unit configured to generate overtones for enhancing a bass perception of the at least one audio channel, the memory further comprising instructions to cause the processor to implement at least one adder configured to add the overtones to the input audio signal so as to generate an enhanced audio signal.

* * * * *